United States Patent [19]

Okudaira et al.

[11] Patent Number: 4,535,901

[45] Date of Patent: Aug. 20, 1985

[54] BLOW-MOLDED MULTI-PLY VESSEL

[75] Inventors: Tadashi Okudaira; Akio Tsuboi; Yoshihisa Hama; Mamoru Hara, all of Otsu, Japan

[73] Assignee: Toyo Boseki Kabushiki Kaisha, Japan

[21] Appl. No.: 341,425

[22] Filed: Jan. 21, 1982

[30] Foreign Application Priority Data

Jan. 22, 1981 [JP] Japan .................................. 56-8729
Feb. 3, 1981 [JP] Japan ................................. 56-15182

[51] Int. Cl.³ ...................... B65D 23/00; B32B 27/00
[52] U.S. Cl. ....................................... 215/1 C; 428/35
[58] Field of Search ................ 215/1 C, 12 R; 428/35

[56] References Cited

U.S. PATENT DOCUMENTS

4,398,642 8/1983 Okudaira et al. ................... 215/1 C

Primary Examiner—William Price
Assistant Examiner—Sue A. Weaver
Attorney, Agent, or Firm—Jones, Tullar & Cooper

[57] ABSTRACT

A blow-molded multi-ply vessel having excellent physical properties and good appearance which comprises two or more kinds of thermoplastic resins, at least one of which is a thermoplastic polyester resin, said vessel having a multi-ply structure of three or more layers at least at the thin wall part of the body thereof and a single layer structure at least at the open end of the mouth part thereof, and at least the thin wall part of the body being biaxially orientated. The vessel is produced by sequently and alternatively injecting two or more kinds of molten thermoplastic resins into one mold with shifting injection timing from a molding machine having plural injection cylinders with one mold closing operation to form a multi-ply parison and then blow-molding the parison at an orientating temperature.

6 Claims, 5 Drawing Figures

BLOW-MOLDED MULTI-PLY VESSEL

BACKFROUND OF THE INVENTION

1. Field of the Invention

The present invention relates to a blow-molded vessel having a multi-ply structure and a method for the production thereof. More particularly, the blow-molded vessel of the present invention as a multi-ply structure composed of laminated different kinds of resins and has improved appearance and physical properties.

2. Prior Art

Recently, various hollow vessels comprising thermoplastic resins have widely been used in the fields of cosmetics, foods and drugs because of their advantages such as lightness, safety against breakage and the like. Particularly, with progress of blow molding technique, especially biaxial orientation blow molding technique, development of hollow vessels which comprise a polyethylene terephthalate having crystallizability and excellent mechanical properties has rapidly been promoted. For example, U.S. Pat. No. 3,733,309 discloses this kind of hollow vessel.

However, the vessels produced from thermoplastic resins, mainly a polyethylene terephthalate, by biaxial orientation technique do not necessarily satisfy all performances. Particularly, these vessels are not suitable for packing foods which require good gas barrier properties because they have poor gas barrier properties against oxygen.

Besides, depending upon the contents to be packed in the vessels, it is required to color the vessels and further to screen the contents from ultraviolet light. Usually, in order to provide these performances to the vessels, additives such as dyes or pigments, ultraviolet absorbing agents and the like are formulated in the thermoplastic resins to be used before molding. However, there is such a disadvantage that the additives are extracted from the molded vessels by the contents packed therein, which causes a hygienic problem and spoils the flavor of the contents. It has been known that a multi-ply structure composed of different kinds of resins having different properties, an innermost layer of which is free from the additives, can be employed to eliminate the above disadvantage. For example, U.S. Pat. No. 3,882,259 discloses a multi-ply vessel which comprises an inner and an outer layer each composed of a polyethylene and a middle layer composed of a blend of an ionomer and an ethylene/vinyl alcohol copolymer. This vessel is produced by extruding the three layers simultaneously to form a three-layer tube, pinching off the tube while it is hot to seal one end thereof to form the bottom part of the vessel and then blow-molding the pinched tube (parison) in a desired shape of the vessel. However, according to this process, the molded vessel has such a structure that the middle layer thereof is exposed to the atmosphere at the open end (mouth part) of the vessel, which causes some disadvantages such as deterioration of gas barrier properties due to the effect of water, and the tendency toward loss of at the non-orientated part of the vessel due to crystallization and the like. Further, the present inventors have previously found that a three-layer vessel which comprises an inner and an outer layer each composed of a polyethylene terephthalate and a middle layer composed of a metaxylylene group-containing polyamide resin has excellent gas barrier properties and have filed patent applications directed to this vessel (Japanese Patent Laid Open Publication Nos. 64839/1981 and 64866/1981 and International Application WP 81 01265). Only one process for the production of the vessel which is disclosed in these patent applications is a successive laminate modling process (i.e. stepwise formation of the inner, middle and then outer layers). However, when a multi-ply parison is formed by using a crystalline thermoplastic resin according to this process, occasionally, it is difficult to obtain a transparent multi-ply parison because an opaque portion appears around the gate mark of the bottom part or haze develops on the entire parison depending upon the variation of cooling efficiency at molding and the shape of the parison. As a result of the present inventors' further study, it has been newly found that this disadvantage results from the following:

In case of a successive injection laminate molding, a molten crystalline thermoplastic resin which forms the inner layer, particularly, a polyethylene terephthalate, a polyamide or the like is solidified in a transparent amorphous state by quenching. However, when the middle or the outer layer is formed sequently as a molten resin, it is difficult to quench because the molten resin flows on the surface of the inner amorphous resin layer or the middle layer (in case of formation of the outer layer) and is cooled through the inner layer or both inner and middle layers, and hence, the interfacial part of the layers becomes opaque due to heat crystallization of the resins of both layers.

The crystallization as above causes not only deterioration of blow moldability of the resulting multi-ply parison but also other disadvantages such as lowering of the interfacial adhesion between both resins, deterioration of physical properties of the hollow vessel to be obtained and the like. Furthermore, in the above patent applications, the vessel also has such a structure that the middle layer thereof is exposed to the atmosphere at the mouth part of the vessel, which causes loss of transparency at the non-orientated part of the vessel due to the effect of water.

OBJECTS AND SUMMARY OF THE INVENTION

One object of the present invention is to provide a blow-molded multi-ply vessel of a thermoplastic polyester resin having excellent gas barrier properties, excellent ultraviolet-screening properties and high hygienic qualities without deterioration of excellent mechanical properties, high transparency and high heat resistance of the thermoplastic polyester resin.

Another object of the present invention is to provide a blow-molded multi-ply vessel having such a structure that the middle layer thereof is completely covered by both inner and outer layers to provide good water resistance, high chemical resistance and high hygienic qualities.

Another object of the present invention is to provide a blow-molded multi-ply vessel having high interfacial adhesion between layers.

Still another object of the present invention is to provide a method for the production of a blow-molded multi-ply vessel having excellent physical properties as described above.

BRIEF DESCRIPTION OF THE DRAWINGS

These objects as well as other objects and advantages of the present invention will become apparent to those skilled in the art from the following description by reference to the accompanying drawings wherein.

DETAILED DESCRIPTION

According to the present invention, there is provided a blow-molded multi-ply vessel which comprises two or more kinds of thermoplastic resins, at least one of which being a thermoplastic polyester resin, said vessel having a multi-ply structure of three or more layers at least at the thin wall part of the body thereof and a single layer structure at least at the open end of the mouth part thereof, and at least the thin wall part of the body being biaxially orientated. The blow-molded multi-ply vessel of the present invention can be produced by sequently and alternatively injecting molten two or more kinds of molten thermoplastic resins, at least one of which is a thermoplastic polyester resin, into one mold with shifting injection timing from a molding machine having plural injection cylinders with one mold closing operation to form innermost and outermost surface layers composed of firstly injected thermoplastic resin and a middle layer composed of the subsequently injected thermoplastic resin and then blow-molding the resulting parison having a single layer structure at least at the open end of the mouth part thereof and a multi-ply structure of three or more layers at the remaining part thereof with a pressurized fluid (e.g. compressed air, etc.) at an orientating temperature.

The multi-ply structure of the vessel of the present invention may be composed of an odd number of layers such as three layers, five layers, seven layers and so on, but, in practice, three or five layers are preferable. It is preferable that the innermost and the outermost, layers are composed of a thermoplastic polyester resin, but the middle layer may also be composed of a thermoplastic polyester resin.

The multi-ply vessel of the present invention is excellent in various properties such as physical properties, appearance and hygienic qualities as well as adhesion between layers. Further, gas barrier properties of the vessel can be improved by using thermoplastic resin having excellent gas barrier properties as the middle layer of the multi-ply structure thereof. Furthermore, appearance and hygenic qualities of the vessel can be further improved by incorporating an ultraviolet absorbing agent and/or a dye or pigment into the middle layer. Particularly, the multi-ply vessel of the present invention can maintain its original superior performances for a long period of time because the mouth part thereof has the single layer structure of a thermoplastic resin which forms both innermost and outermost layers at the body thereof to wrap the middle layer therein and hence, the additives incorporated into the middle layer hardly dissolve or migrate in a content packed in the vessel and hence, loss of transparency and change of properties of the middle layer due to the effect of the content can be prevented. Even if a thermoplastic resin having relatively high rate of crystallization such as a polyethylene terephthalate, a polyamide or the like is used, the amorphous, transparency multi-ply parison having improved adhesion between layers can be obtained and the blow-molded multi-ply vessel having high transparency and good interfacial adhesion between layers can be produced from the parison. Moreover, the hollow vessel having desired physical properties and improved appearance or design properties can be obtained by appropriately adjusting properties of the middle layer. For example, the hollow vessel having good iridescent luster can be obtained by using as the middle layer a blend of resins having different refractive indexes. Further, the ratio of thickness of the middle layer to wall thickness of the multi-ply parison can be freely changed by using one mold and the cross-section of the vessel wall can be partially changed from the single structure to the multi-ply structure.

Examples of the thermoplastic resins used in the present invention are polyester resins, polyamide resins, polymers having high nitrile contents, ethylene/vinyl alcohol copolymers, polyolefin resins, polyacrylic resins, polyvinyl chloride resins, polycarbonate resins, polystyrene resins and the like. At least one of the resins to be used in the present invention should be a thermoplastic polyester resin.

As the polyester resin, there can be used a homopolymer such as a polyethylene terephthalate, a polybutylene terephthalate or a polycyclohexanedimethylene terephthalate and a copolyester which is mainly composed of terephthalic acid and ethylene glycol and is partially copolymerized with one or more other acid components and/or one or more other glycol components, said other acid component including isophthalic acid, diphenyl ether-4,4'-dicarboxylic acid, naphthalene-1,4- or 2,6-dicarboxylic acid, adipic acid, sebacic acid, decane-1,10-dicarboxylic acid, hexahydroterephthalic acid and the like and said other glycol component including propylene glycol, 1,4-budanediol, neopentyl glycol, diethylene glycol, 1,6-hexylene glycol, cyclohexane dimethanol, 2,2-bis(4-hydroxyphenyl)propane, 2,2-bis(4-hydroxyethoxyphenyl)propane and the like. The other acid component and/or other glycol component are copolymerized in an amount of not more than 40 mol %, preferably, not more than 20 mol %. The polyester resin may also contain an oxy-acid component such as hydroxyethoxybenzoic acid and the like. Further, the polyester resin may be a polyester elastomer which is obtained by copolymerizing with as an acid component a dimer acid and as a glycol component a polyether glycol, a polyester elastomer which is obtained by copolymerizing with caprolactone, an ionic polyester which is obtained by copolymerizing with small amount of 5-sodium sulfoisophthalic acid and the like. The polyester resin may be used in a blend of these homopolymers and copolymers. As mentioned above, in the present invention, it is preferable that the innermost and the outermost layers of the vessel are made of the polyester resin. An intrinsic viscosity of the polyester resin should be 0.55 or more, preferable, 0.65 to 1.4.

The polyamide resins to be used in the present invention include aliphatic polyamide resins such as polycaprolactam (nylon 6), polyundecanamide (nylon 11), polylauric lactam (nylon 12), polyhexamethyleneadipamide (nylon 6,6), polyhexamethylenesebacamide (nylon 6,10), caprolactam/lauric lactam copolymer, caprolactam/hexamethylenediammonium adipate copolymer and lauric lactam/hexamethylenediammonium adipate copolymer; metaxylylene group-containing poplyamide resins such as polymetaxylyleneadipamide, polymetaxylylenesebacamide, polymetaxylylenesuberamide, metaxylylene/paraxylyleneadipamide copolymer, metaxylylene/paraxylylenepimelamide copolymer and metaxylylene/paraxylylene-azeramide copolymer; and blends of these homopolymers and copolymers. The polyamide resin may be a polyamide elastomer obtained by copolymerizing caprolactone, a dimer acid, a polyether diamine and the like. A relative viscosity of the polyamide resin should be 1.5 or more, preferably, 2.0 or more.

The polymers having high nitrile contents to be used in the present invention include thermoplastic copolymers containing 40 to 97 mol % of a nitrile group-containing unsaturated ethylenic monomer such as acrylonitrile, methacrylonitrile or a mixture thereof based on the copolymer and as the remaining copolymerizable component 3 to 60 mol % of one or more of copolymerizable monomers such as styrene, vinyltoluene, butadiene, isoprene, methyl methacrylate, ethyl acrylate, methyl vinyl ether and the like.

The ethylene/vinyl alcohol copolymers to be used in the present invention include copolymers of ethylene and vinyl esters such as vinyl formate, vinyl acetate and vinyl propionate. It is preferable that at least 96% of the vinyl ester in the ethylene/vinyl alcohol copolymer is saponified.

The polyolefin resins to be used in the present invention include homopolymers of olefins such as ethylene, propylene, butene-1 and 4-methylpentene-1; and copolymer containing at least 65% of these α-olefins. Suitable examples of the polyolefin resins are a high-, moderate- or low-pressure polyethylene; a copolymer of ethylene and vinyl acetate; a copolymer of ethylene and methyl methacrylate or methyl acrylate; a copolymer of ethylene or propylene and acrylic acid or methacrylic acid, or a partial or complete metal salt of the copolymer; a polypropylene; a copolymer of ethylene and propylene; or a polymethylpentene-1.

The polyacrylic resins to be used in the present invention include polymers or copolymers containing at least 65% of methacrylates. Suitable examples of the polyacrylic resins are a polymethyl methacrylate, a polyethyl methacrylate, a copolymer of methyl methacrylate and styrene or α-methylstyrene, or a copolymer or graft-copolymer of a rubbery material with methyl methacrylate and/or ethyl acrylate.

By appropriately combining the polyester resin with at least one different kind of the thermoplastic resins as listed above, the properties of the vessel to be obtained such as gas barrier properties, resistance to moisture permeation and heat resistance can be improved. For example, when the middle layer is made of a thermoplastic resin such as an ethylene/vinyl alcohol copolymer, a polymer having high nitrile content or a metaxylylene group-containing polyamide and the innermost and the outermost surface layers are made of a polyester resin, the hollow vessel having high hygienic qualities as well as excellent gas barrier properties and excellent resistance to moisture permeation can be obtained. Particularly, it is preferable to use the thermoplastic polyester resin mainly composed of repeating units consisting of ethylene terephthalate to form the innermost and outermost layers and to use the metaxylylene group-containing polyamide resin to form the middle layer.

Further, by incorporating the additives such as a colorant and an ultraviolet absorbing agent into the resin which forms the middle layer, dissolution and migration of the additives in a content to be packed are prevented and shelf stability of the content can be remarkably improved.

As the colorant, there can be used a perylene dye or pigment, a perinone dye or pigment, an anthrapyridone dye or pigment, an anthraquinone dye or pigment, a quinoline dye or pigment, a quinacridone dye or pigment, a condensed azo dye or pigment, a phthalocyanine pigment, carbon black, transparent titanium oxide, red oxide ($Fe_2O_3$), iron oxide ($Fe_3O_4$), titanium yellow, cobalt violet, ultramarine blue or the like. Preferably, the colorant is used in an amount not more than 0.5 part by weight per 100 parts by weight of the thermoplastic resin which forms the middle layer.

Examples of the ultraviolet absorbing agent are benzophenone derivatives and benzotriazole derivatives. Further, a ultraviolet-absorbing group may be introduced in the molecular chain of the thermoplastic resin. For example, an ultraviolet-absorbing unsaturated ethylenic monomer can be copolymerized during the production of the above thermoplastic polyacrylic or polyolefin resin.

Further, the additives may be incorporated into one or more layers other than the middle layer as far as they do not cause problem such as hygienic problem.

When the additives are used, the thermoplastic resins per se of each layer are not necessary different from each other. For example, by using the same thermoplastic polyester resin, the multi-ply vessel having the colored middle layer and the colorless innermost and outermost surface layers or having the colored or colorless middle layer and the colored innermost and outermost surface layers which may be different from the middle layer in color (as far as the colorant used causing no hygienic problem or depending upon a content to be packed) can be obtained and hence, in addition to improvement of shelf stability, appearance or design properties and hygienic qualities of the vessel can be remarkably improved.

In this regard, the term "different kind" used herein includes the difference between the compositions of the resin (whether the resin contains any additive or not) as well as the difference between the resins themselves.

In addition, the hollow vessel having superior chemical resistance, mechanical properties and iridescent luster to those of a conventional vessel can be obtained by using as the thermoplastic resin of the middle layer a blend of at least two kinds of thermoplastic resins (for example, the blend of the polycarbonate resin and the methyl methacrylate resin disclosed in Japanese Patent Publication No. 13384/1968 and the blend of the polyacrylic resin and the aliphatic saturated polyolefin resin or the aromatic polyester resin disclosed in Japanese Patent Publication No. 31467/1971) or a blend of these thermoplastic resins and a synthetic pearl essence.

The method for the production of the multi-ply vessel of the present invention is explained hereinafter with reference to the drawings.

Firstly, it is necessary to form the multi-ply parison by using a molding machine having plural injection cylinders and one mold which can sequently and alternatively inject at least two kinds of thermoplastic resins with shifting injection timing with one mold closing operation.

Figure 1:
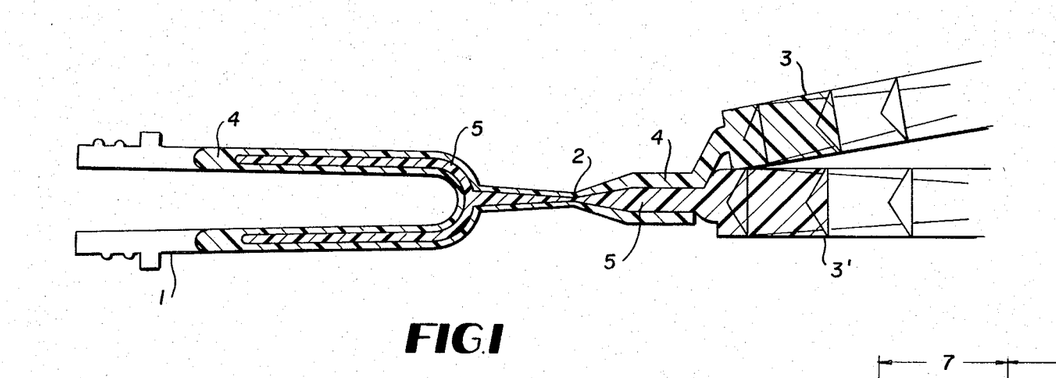
FIG. 1 is a schematic cross-section illustrating the relationship between the apparatus and the mold in a preferred embodiment of the production of the multi-ply parison according to the present invention wherein two injection machines are used.

For example, a preferred embodiment of the production of the multi-ply parison is shown in FIG. 1. In FIG. 1, two injection cylinder 3 and 3' are connected to one nozzle 2 and the nozzle is connected to the mold 1. When the injection of the thermoplastic resin 4 from the injection cylinder 3 is initiated and the other thermoplastic resin 5 is injected from the other injection cylinder 3' with a short delay of injection timing, the resin 5 (i.e. the resin for the middle layer) flows without mixing with the unsolidified portion of the firstly injected resin 4 and hence, the multi-ply parison having the innermost and outermost surface layers composed of the resin 4 and the middle layer composed of the resin 5 can be formed. In this case, it is important to inject the resin 5 before the firstly injected molten resin 4 is completely cooled and solidified in the mold. The cross-section of this parison has the concentric circular multi-ply structure of the lamination layers of the resin 4/the resin 5/the resin 4. Besides, although the cross-section of the parison at the gate part thereof has two-layer structure in which the firstly injected resin 4 is concentric circularly arranged around the resin 5, it can be changed to three-layer structure by further injecting the resin 4 after completion of the injection of the resin 5 to completely replace the resin 5 at the gate part by the resin 4.

Figure 2:
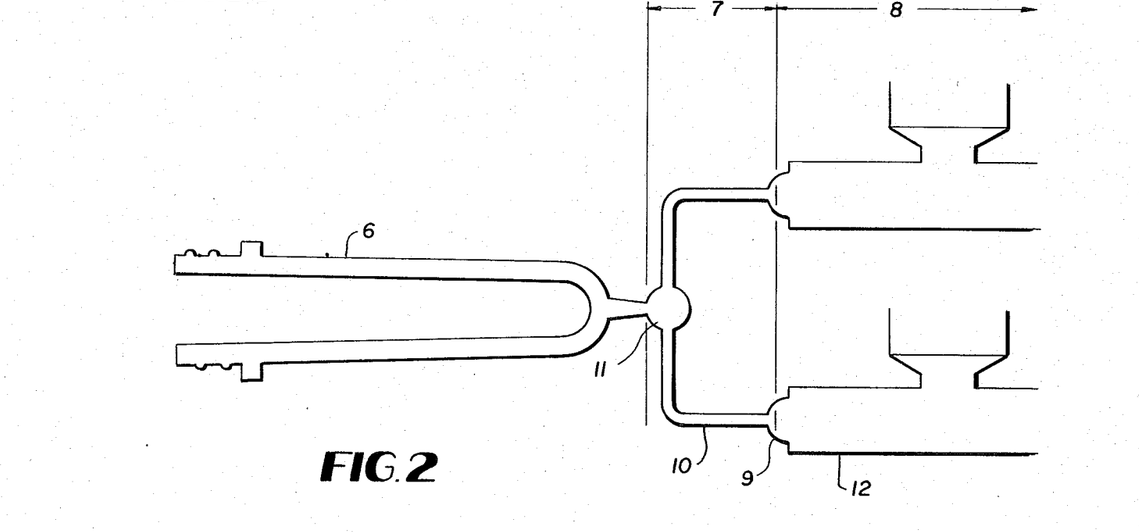
FIG. 2 is a diagram illustrating another preferred embodiment of the production of the multi-ply parison according to the present invention.

Another preferred embodiment of the production of the parison is shown in FIG. 2. In FIG. 2, the injection molding machine 8 includes two injection cylinders and each cylinder 12 has a nozzle 9. Different from the molding machine in FIG. 1, each nozzle 9 is connected to a runner part 7 of the mold 6, respectively and the end of each runner 7 is connected each other to constitute a valve gate part 11 of the mold 6. As is explained in FIG. 1, the multi-ply parison can be obtained by sequentially and alternatively injecting the molten thermoplastic resins with shifting injection timing from the molding machine 8.

According to the above method for the production of the multi-ply parison, each resin can be injected and laminated to each other in the mold within a very short period of time and hence, even if the crystalline resin such as the polyethylene terephthalate is used, the resin can be quenched without giving enough time to crystallize at the interfacial part to form an amorphous resin layer. Thus, the multi-ply parison having high transparency can be obtained.

Figures 3, 4, 5:
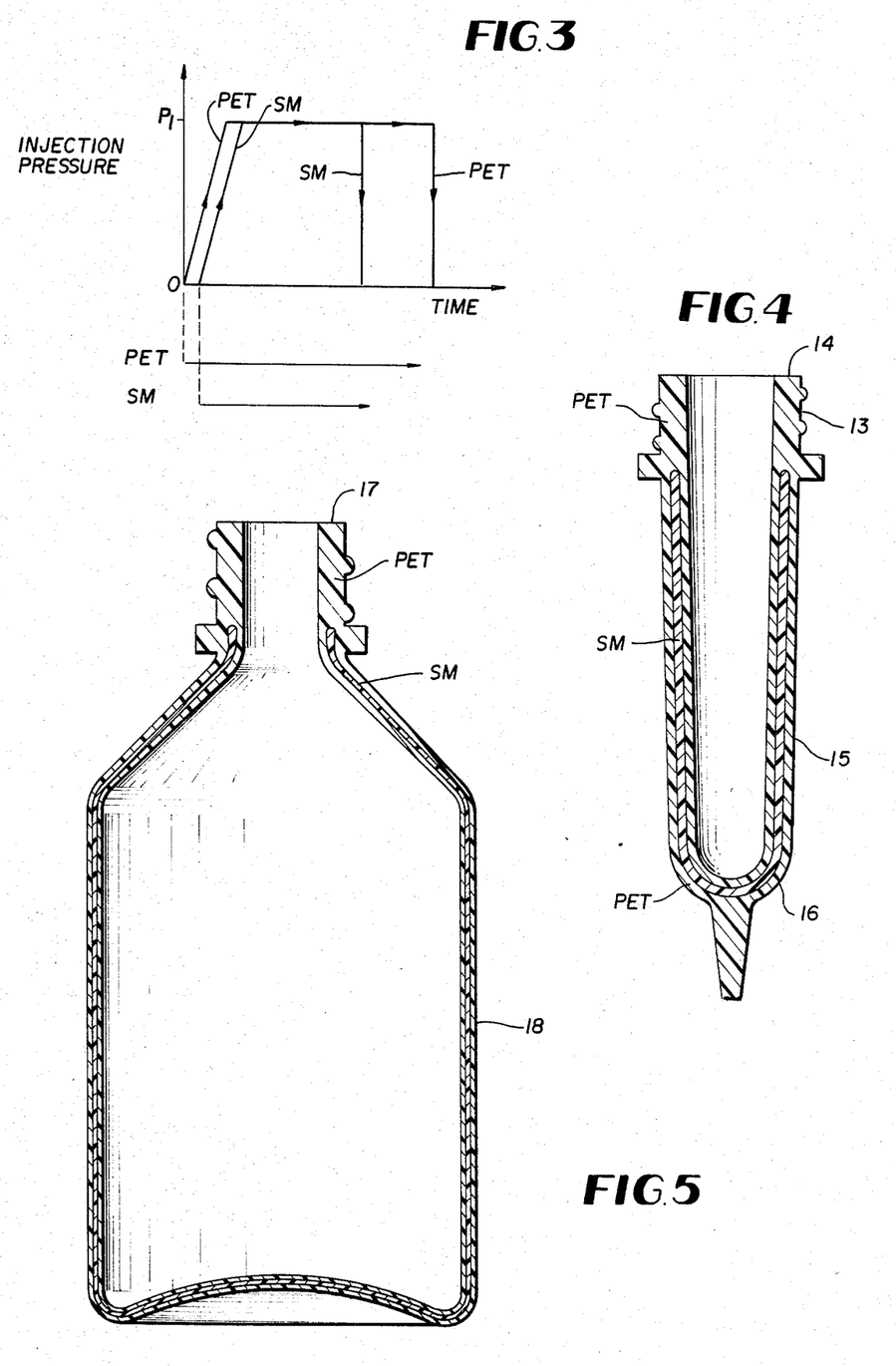
FIG. 3 is a graph illustrating a preferred injection pattern in the production of the multi-ply parison made of polyethylene terephthalate (PET) and a metaxylylene group-containing polyamide (SM) by using the apparatus and the mold of FIG. 1.
FIG. 4 is a cross-section of the multi-ply parison obtained according to the injection pattern of FIG. 3.
FIG. 5 is a cross-section of a preferred embodiment of the blow-molded multi-ply vessel of the present invention,.

FIG. 3 shows a preferred injection pattern in the production of the parison by using the apparatus and the mold of FIG. 1. In the graph of FIG. 3, the transverse axis indicates time and the ordinate axis indicates injection pressure. The graph shows the program in which the metaxylylene group-containing polyamide (SM) which is used as the resin 5 in FIG. 1 is injected for an appropriate time with an appropriate delay of injection timing while the polyethylene terephthalate (PET) which is used as the resin 4 in FIG. 1 is continuously injected at the injection pressure of $P_1$. Although, in FIG. 3, the injection pressure of SM is the same as that of PET, it may be higher or lower than $P_1$.

FIG. 4 shows the cross-section of the parison obtained according to the injection pattern of FIG. 3. The multi-ply parison of FIG. 4 has SM layer sandwiched by PET layers. Although, in FIG. 4, SM layer reaches to the screw part 13 of the parison, the distance of flow of SM layer can be appropriately varied by adjusting the injection timing of SM resin. However, the parison should be molded in such a structure that at least the open end of the mouth part 14 has the single layer structure of PET and the body 15 which is orientated later has the multi-ply structure.

The shape of the multi-ply parison is not critical in so far as it is in a geometric form which can be expanded.

The thickness of the middle layer can be changed by adjusting molding conditions (e.g. plasticizing capacity of the resin 5, injection timing of the resin 5, etc.), melting viscosity and rate of crystallization of the thermoplastic resins 4 and 5, and the like. In general, the thickness is controllable until the ratio of the thickness of the middle layer to the total thickness of the innermost and the outermost layers (thickness of the resin 5/thickness of the resin 4) becomes about 0.05 to 20. In the present invention, it is preferable that this ratio is 0.1 to 1. In practice, the total thickness of the parison is 1 to 10 mm, preferably 2 to 7 mm.

Depending upon the injection timing of the two thermoplastic resins, the parison obtained may have such a structure that body 15 being distant from the gate has a three-layer structure and the part 16 being in the neighborhood of the gate has the structure of more than three layers due to turbulence. Such a parison is also included in the present invention.

Although the description hereinbefore has been mainly referred to the parison having a three-layer structure, the parison having a more complicated structure can be obtained by using a molding machine having three or more injection cylinders.

Besides, the thermoplastic resin which forms the innermost and outermost layers or the middle layer may optionally be incorporated with additives such as antistatic agents, anti-thermal oxidation deterioration agents, anti-bacterial agents, lubricants, agents for improving interfacial adhesion between the resins, immiscible and micro-dispersing polymers for improving impact strength and the like. Further, thickness of each layer of the multi-ply parison can be varied by adding a viscosity builder or viscosity depressant and adjusting injection conditions. Furthermore, the multi-ply parison having low transparency can be obtained by adding a crystallization accelerator. Examples of the agent for improving interfacial adhesion between the resins are polyester copolymers, copolyamides, modified olefin resins, polyurethane resins and the like. Particularly, it is preferable to add the agent to the thermoplastic resin which forms the middle layer. The amount of the agent is preferably not more than 30% by weight based on the thermoplastic resin.

The multi-ply parison thus obtained is heated to an orientating temperature and then expanded and orientated in a blow mold by using a conventional biaxial blow molding machine to produce the biaxially orientated vessel of the present invention. As the result of a peel test conducted by using test pieces cut from the vessel thus obtained, it has been found that the vessel of the present invention which used the parison obtained by the above method shows much higher bond strength than a conventional blow-molded multi-ply vessel which uses a parison obtained by a successive laminate molding and having high density at an interface between resins. According to the present invention, each thermoplastic resin used can effectively exhibit its excellent properties and hence, the hollow vessel having excellent mechanical properties and appearance can be obtained. Further, optionally, the hollow vessel having a ground glass like surface can be obtained by clouding the outer surface of the parison by treatment with a solvent or heat treatment and then blow-molding the parison thus treated.

When the polyester resin mainly composed of ethylene terephthalate repeating units is used, in general, it is desirable to carry out the orientation at a parison temperature from $(Tg+15)°$ C. to $(2Tg+15)°$ C., preferably, 85° to 150° C., wherein Tg means a glass transition temperature of the polyester resin. Therefore, it is preferable to modify other kinds of thermoplastic resins to be used by copolymerization, blending or the like so that these resins can be orientated at the same temperature as described above.

In general, a draw ratio of 1.1 to 4 times in longitudinal direction and of 2 to 7 times in crosswise direction (based on the perimeter)is preferable and an area draw ratio (draw ratio in longitudinal direction x draw ratio in crosswise direction) of 5 to 18 times is preferable.

FIG. 5 shows a cross-section of a preferred embodiment of the multi-ply vessel of the present invention thus obtained. The vessel shown in FIG. 5 has the open end of the mouth part 17 and this part has the single layer structure which lacks the middle layer. The thin wall part 18 has the multi-ply structure of three or more layers and is biaxially orientated by blow molding.

Optionally, thermal dimensional stability of the multi-ply vessel of the present invention can be improved by heat treatment. Further, printing or mar-proof treatment can be provided to the parison and/or the vessel.

The following examples further illustrate the present invention but are not to be construed to limit the scope thereof.

The methods of measurement of main characteristics determined in the present invention are as follows:

(1) Intrinsic viscosity $[\eta]$ of the polyethylene terephthalate (hereinafter referred to as PET): It was measured at 30° C. by using the mixed solvent of phenol-tetrachloroethane (6:4, w/w);

(2) Relative viscosity $[\eta \text{ rel}]$ of the metaxylylene group-containing polyamide (hereinafter referred to as SM): It was measured at 25° C. by dissolving the resin (1 g) in 96% sulfuric acid (100 ml);

(3) Density$\rho$:

Sampling method: The multi-ply parison was sectioned into the upper, center, lower and bottom parts and a cylindrical or dome like piece of 5 to 10 mm in width was cut from each part by a hacksaw. Each piece was further divided into two half-round pieces and the layers of each half-round piece were mechanically separated. The surface of the layer which contacts with the other layer was cut in the depth of 0.5 mm by a cutter to give the test piece;

Measurement: By using a carbon tetrachloride-n-heptane density gradient tube for PET and a carbon tetrachloride-toluene density gradient tube for SM, density was calculated based on the equilibrium stationary position of the test piece thrown into the tube. The measuring temperature was 30° C.;

(4) Transparency and haze: Haze meter-S manufactured by Toyo Seiki was used and according to JIS-K6714, these were calculated as follows:

$$\text{Transparency} = (T_2/T_1) \times 100\ (\%)$$

$$\text{Haze} = \frac{T_4 - T_3(T_2/T_1)}{T_2} \times 100\ (\%)$$

in which $T_1$ is an amount of incident light, $T_2$ is a total amount of transmitted light, $T_3$ is an amount of light scattered by the device and $T_4$ is an amount of light scattered by the device and the specimen;

(5) Amount of oxygen permeation: According to ASTM-1434-58, it was determined by measuring pressure change at 30° C. with a twin gas transmission measuring instrument manufactured by Rika Seiki Kogyo (cc/m$^2$·24 hr·atm); and (6) Amount of moisture permeation: According to JIS-Z-0208, it was determined by measuring weight gain at 40° C. under 90% RH by cup method (g/m$^2$·24 hr).

EXAMPLES 1 TO 9

Various multi-ply parisons composed of the combinations of the resins shown in Table 1, each of which had the structure as shown in FIG. 4, were produced by using M-140-MJ injection molding machine manufactured by Meiki Seisakusho. Each parison was shaped in the closed-end tubular shape of 35 mm in outer diameter, 140 mm in length and 5 mm in thickness and had the single layer structure composed of the resin which formed both inner and outer layers at the open end of the mouth part and the three-layer structure at the body. Molding conditions and thickness of each layer of each parison are summerized in Table 1. Details of the resins and the additives in Table 1 are as follows:

PET-1: polyethylene terephthalate, $[\eta]=0.72$;
PET-2: polyethylene terephthalate, $[\eta]=1.0$;
SM: polymetaxylylene-adipamide (metaxylylene-/paraxylylene=99/1, w/w), $[\eta \text{ rel}]=2.2$;
High nitrile-content polymer: "Barex 210" manufactured by Vistron;
Ethylene/vinyl alcohol copolymer: "Eval E" manufactured by Kuraray;
Polycarbonate: "Panlite" manufactured by Teijin Kasei;
Polyvinyl chloride: "Kanevinyl" manufactured by Kanegafuchi Chemical;
Red oxide: C.I. Pigment Red 101 (0.05 part by weight per 100 parts by weight of the resin);
Phthalocyanine green: C.I. Pigment Green 7 (0.05 part by weight per 100 parts by weight of the resin);
Ultraviolet absorbing agent: "Tinuvin-326" manufactured by Ciba-Geigy;
Polymethyl methacrylate: "Delpet" manufactured by Asahi Kasei; and
Ethylene/acrylic acid metal salt copolymer: "Surlyn 1605" manufactured by Du Pont.

TABLE 1

|  | Example 1 | Example 2 | Example 3 | Example 4 | Example 5 |
| --- | --- | --- | --- | --- | --- |
| Thermoplastic resin |  |  |  |  |  |
| Inner and outer layers | PET-1 | PET-1 | PET-1 | PET-1 | Polyvinyl chloride |

TABLE 1-continued

| Middle layer | SM | High nitrile-content polymer | Ethylene/vinyl alcohol copolymer | Polycarbonate | PET-1 |
|---|---|---|---|---|---|
| Molding conditions | | | | | |
| Cylinder temp. (°C., from hopper) Injection machine 1 (inner and outer layers) | 250 × 270 × 280 × 280 | 250 × 270 × 280 × 280 | 250 × 270 × 280 × 280 | 250 × 270 × 280 × 280 | 150 × 160 × 180 × 180 |
| Injection machine 2 (middle layer) | 230 × 260 × 280 × 280 | 180 × 200 × 220 × 220 | 180 × 200 × 220 × 220 | 250 × 280 × 290 × 290 | 250 × 270 × 280 × 280 |
| Injection pressure (kg/cm², gauge) Injection machine 1 | 50 | 70 | 50 | 100 | 70 |
| Injection machine 2 | 50 | 70 | 50 | 110 | 70 |
| Delay of injection timing of middle layer resin (sec.) | | | 0.2 | | |
| pressure dwelling time (sec.) | | | 15 | | |
| Cooling time (sec.) | | | 30 | | |
| Mold temp. (°C.) | | | 20 | | |
| Thickness | | | | | |
| Outer layer (mm) | 1.5 | 1.6 | 1.5 | 1.6 | 1.6 |
| Middle layer (mm) | 2.0 | 1.8 | 2.0 | 1.8 | 1.8 |
| Inner layer (mm) | 1.5 | 1.6 | 1.5 | 1.6 | 1.6 |
| Ratio of middle layer/inner + outer layers | 0.67 | 0.56 | 0.67 | 0.56 | 0.56 |
| Main effect | | | | | |
| Effect | gas barrier properties | gas barrier properties | gas barrier properties | heat resistance | heat resistance |
| Layer contributing effect | middle layer | middle layer | middle layer | middle layer | middle layer |

| | Example 6 | Example 7 | Example 8 | Example 9 |
|---|---|---|---|---|
| Thermoplastic resins | | | | |
| Inner and outer layers | PET-1 | PET-1 | PET-1 | PET-2 |
| Middle layer | SM & red oxide | PET-1 & phthalocyanine green | PET-1 & Ultroviolet absorbing agent | Delpet, PET-1 & Surlyn 1605 (75:20:5) |
| Molding conditions | | | | |
| Cylinder temp. (°C., from hopper) Injection machine 1 (inner and outer layers) | 250 × 270 × 280 × 280 | 250 × 270 × 280 × 280 | 250 × 270 × 280 × 280 | 250 × 280 × 290 × 290 |
| Injection machine 2 (middle layer) | 230 × 260 × 280 × 280 | 250 × 270 × 280 × 280 | 250 × 270 × 280 × 280 | 250 × 260 × 270 × 270 |
| Injection pressure (kg/cm², guage) Injection machine 1 | 70 | 70 | 70 | 50 |
| Injection machine 2 | 40 | 70 | 70 | 50 |
| Delay of injection timing of middle layer resin (sec.) | | | 0.2 | |
| Pressure dwelling time (sec.) | | | 15 | |
| Coolding time (sec.) | | | 30 | |
| Mold temp. (°C.) | | | 20 | |
| Thickness | | | | |
| Outer layer (mm) | 2.0 | 1.7 | 1.7 | 1.5 |
| Middle layer (mm) | 1.0 | 1.6 | 1.6 | 2.0 |
| Inner layer (mm) | 2.0 | 1.7 | 1.7 | 1.5 |
| Ratio of middle layer/inner + outer layers | 0.25 | 0.47 | 0.47 | 0.67 |
| Main effect | | | | |
| Effect | color & gas barrier properties | color | shelf stability | iridescent luster |
| Layer contributing effect | middle layer | middle layer | middle layer | middle layer |

When densities of the boundary surface parts of layers of the multi-ply parison obtained in Example 1 were measured, they were 1.338 to 1.339 g/cc at the surface of the inner layer (PET), 1.206 to 1.208 g/cc at both inner side and outer side surfaces of the middle layer (SM) and 1.338 to 1.339 g/cc at the surface of the outer layer (PET). It will be apparent to those skilled in the art that each layer is in an amorphous state and has high transparency.

Besides, when the same procedure as in Example 1 was repeated except that a polyester copolymer mainly composed of the repeating units of ethylene terephthalate was substituted for PET and SM having a different composition was substituted for SM in Example 1, the multi-ply parison having high transparency was obtained. Density of the polyester copolymer layer was 1.33 to 1.345 g/cc and density of the SM layer was 1.20 to 1.215 g/cc.

On the other hand, when PET and SM were injected simultaneously to from a multi-ply parison (Reference Example 1), PET and SM mixed in molten states and hence, the parison obtained showed pearly appearance.

The multi-ply parison obtained in Example 1 and a transparent parison made of only PET (outer diameter: 35 mm, length: 140 mm, thickness: 4 mm) (Reference Example 2) (molding conditions: cylinder temperature from hopper 270°×290°×290° C., injection pressure 40 kg/cm$^2$·guage, mold temperature 20° C., injection pressure dwelling time 15 seconds, cooling time 25 seconds) were blow-molded by using a biaxial orientating blow molding machine under conditions of 22 cm/sec. of the travel rate of the orientating rod, 20 kg/cm$^2$ of the compressed gas pressure, 130° C. of the orientating temperature and 5.59 of the draw ratio (axial 2.04×peripheral 2.74). The characteristics of the resulting vessels are shown in Table 2.

TABLE 2

|  | Example 1 | Ref. Example 2 |
|---|---|---|
| Transparency (%) | 88 | 85 |
| Haze (%) | 1.7 | 2.5 |
| Amount of oxygen permeation (cc/m$^2$ · 24 hr · atm) | 1.3 | 8.0 |

As is clear from Table 2, the blow-molded vessel produced by using the multi-ply parison (Example 1) according to the present invention has excellent gas (oxygen) barrier properties and high transparency. Further, adhesion between PET layer and SM layer of this vessel was very good and this vessel had enough mechanical strength for a pressurized vessel.

EXAMPLE 10

The multi-ply parisons obtained in Examples 1 to 9, the parison of Reference Example 2 and the multi-ply parisons as shown in Table 3 which were successively molded from the inner layer to the outer layer by using N-95 injection machine manufactured by Nippon Seikosho and successively changing molds (inner layer: PET 2 mm/middle layer: 1.5 mm/ outer layer: PET 1.5 mm) were orientated and blow-molded under the conditions as shown in Table 4.

Besides, densities of the boundary surface parts of the layers of the multi-ply parison obtained in Reference Example 3 of Table 3 were 1.348 g/cc at the surface of the inner layer (PET), 1.221 g/cc at the inner side surface of the middle layer, 1.224 g/cc at the outer side surface of the middle layer and 1.349 g/cc at the surface of the outer layer (PET) and this parison was opaque.

Further, characteristics of the representative biaxially orientated vessels thus obtained are shown in Table 5.

TABLE 3

|  |  | Reference Example 3 | Reference Example 4 | Reference Example 5 |
|---|---|---|---|---|
| Resins | Middle layer | SM | High-nitrile content polymer | Ethylene/vinyl alcohol copolymer |
| Cylinder temp. (°C., from hopper) | Inner layer | 270 × 290 × 290 | 270 × 290 × 290 | 270 × 290 × 290 |
|  | Middle layer | 260 × 280 × 280 | 180 × 210 × 240 | 180 × 210 × 220 |
|  | Outer layer | 270 × 290 × 290 | 270 × 290 × 290 | 270 × 290 × 290 |
| Injection pressure (kg/cm$^2$, guage) | Inner layer | 40 | 40 | 40 |
|  | Middle layer | 50 | 70 | 50 |
|  | Outer layer | 60 | 60 | 60 |
| Mold temp. (°C.) | Inner layer | 30 | 30 | 30 |
|  | Middle layer | 30 | 20 | 20 |
|  | Outer layer | 30 | 20 | 20 |
| Injection pressure dwelling time (sec.) | Each layer | 15 | 15 | 15 |
| Injection cooling time (sec.) | Each layer | 25 | 25 | 25 |

TABLE 4

|  | Examples | | | | Reference Examples |
|---|---|---|---|---|---|
|  | 1–3 | 4 | 5 | 6–9 | 2–5 |
| Travel rate of orientating rod (cm/sec) | 22 | 22 | 15 | 22 | 22 |
| Compressed gas pressure (kg/cm$^2$) | 20 | 20 | 15 | 20 | 20 |
| Orientation temperature (°C.) | 90 | 110 | 100 | 110 | 90 |
| Draw ratio  Axial |  |  | 2.04 |  |  |
| Peripheral |  |  | 2.74 |  |  |
| Area ratio |  |  | 5.59 |  |  |

TABLE 5

|  | Examples | | | Reference Examples | | | |
|---|---|---|---|---|---|---|---|
|  | 1 | 2 | 3 | 2 | 3 | 4 | 5 |
| Amount of oxygen permeation (cc/m$^2$ · 24 hr · atm) | 1.2 | .6 | 1.3 | 8.3 | 1.4 | 1.8 | 1.3 |
| Amount of moisture permeation (g/m$^2$ · 24 hr) | 0.7 | 0.6 | 0.8 | 0.4 | 0.5 | 0.7 | 0.8 |
| Transparency (%) | 88 | 88 | 85 | 92 | 86 | 87 | 65 |
| Haze (%) | 1.8 | 1.8 | 2.8 | 1.0 | 2.1 | 2.0 | 18 |
| Peel strength between outer and middle | not peeled* | 480 | 450 | — | 230 | ≈0 | ≈0 |

TABLE 5-continued

| | Examples | | | Reference Examples | | | |
|---|---|---|---|---|---|---|---|
| | 1 | 2 | 3 | 2 | 3 | 4 | 5 |
| layers (g/15 mm) | | | | | | | 5 |

*cohesive failure

As is clear from Table 5, the multi-ply biaxially orientated vessel of the present invention has excellent gas barrier properties, high transparency and good interfacial adhesion. Further, because the middle layer is not exposed to the atmosphere at the open end of the mouth part of the vessel, the vessel of the present invention has good hygienic qualities and, even if SM resin which has somewhat inferior water resistance in an unorientated state is used, the vessel maintains good stability for a long period of time without causing any problem.

Furthermore, the biaxially orientated vessel produced from the multi-ply parison of Example 4 is excellent in resistance to heat shrinkage at hot-packing of liquid at a high temperature.

What is claimed is:

1. A blow-molded multi-ply vessel having an open end mouth part and a thin wall part, which comprises:
   a multi-ply structure of three or more odd-numbered layers at least at the thin wall part;
   two or more kinds of thermoplastic resins, at least one of which being a thermoplastic polyester resin mainly composed of the repeating units of ethylene terephthalate;
   the innermost and the outermost layers of said multi-ply structure being composed of said thermoplastic polyester resin;
   at least one of the middle layers of said multi-ply structure being composed of a thermoplastic resin the main component of which is a resin selected from the group consisting of a polyamide resin, a polymer having a high nitrile content, an ethylene/vinyl alcohol copolymer, a polyolefin resin, a polyacrylic resin, a polyvinyl chloride resin, a polycarbonate resin and a polystyrene resin;
   said innermost and outermost layers extending over the entire inside and outside surfaces of said vessel and being integrated at least at the open end mouth part to form a single layer structure of said thermoplastic polyester resin to wrap the middle layers; and
   at least the thin wall part being biaxially oriented.

2. A vessel according to claim 1, wherein at least one of the middle layers is composed of a metaxylylene group-containing polyamide resin.

3. A vessel according to claim 1 or 2, in which the thin wall part of the body has three layers.

4. A multi-ply parison having an open end mouth part, which comprises:
   an innermost and an outermost layer composed of a thermoplastic polyester resin mainly composed of the repeating units of ethylene terephthalate;
   a middle layer composed of a thermoplastic resin the main component of which is a resin selected from the group consisting of a polyamide resin, a polymer having a high nitrile content, an ethylene/vinyl alcohol copolymer, a polyolefin resin, a polyacrylic resin, a polyvinyl chloride resin, a polycarbonate resin and a polystyrene resin; and
   said innermost and the outermost layers extending over the entire inside and outside surfaces of said parison and being integrated at the open end mouth part of said parison to form a single layer structure of said thermoplastic polyester resin to wrap the middle layer.

5. A multi-ply parison according to claim 4, wherein the middle layer is composed of a metaxylylene group-containing polyamide resin.

6. A multi-ply parison according to claim 5, in which the density of the thermoplastic polyester resin is 1.345 g/cc or less and density of the metaxylylene group-containing polyamide resin is 1.215 g/cc or less.

* * * * *